US005733666A

United States Patent [19]

Sinko

[11] Patent Number: 5,733,666

[45] Date of Patent: Mar. 31, 1998

[54] AQUEOUS SEALER COMPOSITION FOR WOOD SURFACES AND PROCESS

[75] Inventor: John Sinko, Glendale, Wis.

[73] Assignee: Wayne Pigment Corp., Milwaukee, Wis.

[21] Appl. No.: 775,394

[22] Filed: Dec. 31, 1996

Related U.S. Application Data

[63] Continuation-in-part of Ser. No. 518,161, Aug. 23, 1995, abandoned.

[51] Int. Cl.[6] ........................ B32B 21/04

[52] U.S. Cl. ........................ 428/537.1; 427/297; 427/325; 427/440

[58] Field of Search ........................ 427/297, 325, 427/440; 428/537

[56] References Cited

U.S. PATENT DOCUMENTS

| | | | |
|---|---|---|---|
| 3,183,118 | 5/1965 | Conner | 117/138.5 |
| 3,291,635 | 12/1966 | Conner | 117/138.5 |
| 3,852,087 | 12/1974 | Nordyke et al. | 106/288 B |
| 4,021,398 | 5/1977 | Gilman et al. | 260/29.6 MM |
| 5,320,872 | 6/1994 | McNeal et al. | 427/393 |
| 5,512,323 | 4/1996 | Beane et al. | 427/408 |
| 5,612,094 | 3/1997 | Schubert et al. | 427/297 |

*Primary Examiner*—Michael Lusignan
*Attorney, Agent, or Firm*—Ryan, Maki, Mann & Hohenfeldt

[57] ABSTRACT

A process of treating wood to reduce the tannin staining of coatings subsequently applied includes the steps of providing a solution of a zirconyl compound in a carrier liquid such as water, applying the solution to a wood surface, and, drying the solution. The pore structure of the wood is modified or sealed so that staining of coating compositions applied subsequently over the surface is reduced. The process is particularly beneficial in cases where the coating composition a clear or a light-colored latex paint, especially white. The preferred zirconyl compound is zirconyl acetate. The treating solution may be modified by addition thereto of a lanthanide compound, especially cerium, to provide UV light protection to a substrate and further by one or more metal cations to impart mildewicidal activity to the composition.

18 Claims, No Drawings

AQUEOUS SEALER COMPOSITION FOR WOOD SURFACES AND PROCESS

This is a continuation-in-part of U.S. patent application Ser. No. 08/518,161, filed Aug. 23, 1995, and now abandoned.

This invention relates to compositions and processes for modifying wood surfaces, particularly to reduce tannin staining of coatings subsequently applied thereto. In a more general sense, the composition and processes are also useful for coating a variety of substrates to prevent coatings subsequently applied thereto from being stained by materials on or in the substrate.

BACKGROUND OF THE INVENTION

From the perspective of a paint manufacturer or user, wood is a substrate characterized by some undesirable properties, such as tannin staining, particularly of white latex coatings.

Structurally, wood is a hydrophilic composite of fibrous cellulose and resinous lignins, containing substantial void volumes, organized as open pore system of diverse microscopic sizes, resulting basically from its capillary structure. The magnitude of the resultant microscopic capillary surface is remarkable, considered to be about 2000 $cm^2/g$.

Notably, swelling by solvents, such as water generate additional capillary structures within the cell walls of wood, characterized by comparatively very large values of capillary surfaces.

It is considered, that the former and the latter large capillary voids and related surfaces, in synergy with the hydrophilic character of cellulosic matter, are accountable for the behavior of wood substrates in moist environments or are displayed by the same when in contact with liquid phases such as aqueous paint applications. With respect to its interaction with water, it will be noted that wood's water content is variable, being dependent on the humidity and temperature of the surrounding atmosphere.

In contact with aqueous solutions, wood substrates generally absorb non-selectively, accompanied by swelling. However, selective absorption of some solutes has also been observed.

Polar organic solvents such as aliphatic alcohols, amines, glycols and derivatives of the same, common components of aqueous or solvent based paint formulations, are absorbed by wood, as the result of these components' ability to form hydrogen bonding with cellulosic —OH groups.

Diverse wood species contain variable, in some cases substantial (up to 12%), amounts of constituents soluble in water and polar organic solvents, for example, tannins, beta-carotenes, azulene etc.

Tannins, formally classified in two main categories of hydrolyzable and condensed, are complex polyhydroxyphenol derivatives of non-uniform composition. The complex chemical composition and structure is consistent with tannins' intricate chemical behavior and physical properties, such as solubility in water and polar organic solvents, color reactions or precipitate formation with heavy metal ions such as $Fe^{++}$, among others.

Some of the chemical and physical characteristics are relevant to the undesirable tannin staining process which commonly results in aesthetic degradation and loss of decorative value of white protective coatings and clear coats applied on wood substrates.

Tannin staining is always prevalent with white aqueous coatings applied on wood substrates and particularly on such species as redwood, notorious for its comparatively high tannin content. It is observable as uniform dark discoloration, or randomly distributed dark-brown colored spots on freshly applied white coatings in contrast to the same coatings applied on non-staining substrates.

In this sense it will be noted, that tannin staining occurs at a particularly high rate during the curing of freshly applied aqueous coatings. Thus they are, to a large extent, discolored at the end of the curing process, and hence at the very beginning of their service life. As for example, acrylic clear applications on oak substrates are known to develop extensive brown-purple discolorations during the film forming period.

It is emphasized however, that tannin staining progresses continuously at variable, although comparatively lower, rates all during the service life of both aqueous and solvent based wood coatings, resulting in ever increasing accumulated discoloration or staining. Under normal service conditions it is the surrounding atmosphere's relative humidity, which determines the staining system's, i.e., the wood substrate and cured coating water content and consequently, controls the rate of the related discoloration process. Alternatively, under condensing humidity conditions, presumably the substrate will be saturated with water and a high staining rate will be diffusionally limited by the related coating's chemical composition, physical structure and specifically, by the substrate's tannin concentration.

As can be seen, tannin staining, a direct consequence of the above described porous structure and water-absorbing capacity of wood, is a dynamic, complex phenomenon which includes several concurrent processes, such as: water or water vapor absorption by coated wood substrates, solubilization of staining constituents, diffusion into the coating and gradual accumulation at the coating-air interface of soluble matter, including tannin species, thus resulting in progressive discoloration of the coating.

By definition, tannin staining inhibition in the above specified sense, implies such capacities of wood coating systems as interaction with dissolved and diffusing tannins, immobilization of staining species in situ in coatings, thus obstructing the accumulation thereof at the coating-air interface and minimizing the overall rate of the discoloration process.

The employment of pigment grade "stain inhibitors" or "tannin blockers" constitutes the state of the art with respect to procedures available for inhibition of wood coating's aesthetic degradation by tannin staining. Reactive stain inhibitors such as synergistic pigment composites as disclosed in my U.S. Pat. No. 5,529,811,, provide highly effective tannin stain inhibitive and moderate fungus growth control capacities to water or solvent-based paint formulations, of which they are a function components.

Tannin stain inhibition by functional pigmentation constitutes an effective procedure available to prevent degradation of coatings by highly staining wood substrates. The limitations of this procedure, however, result from the fact, observed during the development of the present invention, that tannin staining of aqueous coatings freshly applied on wood substrates, occurs to a large extent during the curing process of the same.

Considering the typical volumetric composition of a common, 33% solids and 33% P.V.C. (pigment volume concentration) paint formulation, the reason for the stain inhibitor pigment's apparent ineffectiveness, observed during the critical curing period of aqueous coatings becomes evident. In this respect, it will be noted that typically about 66% by volume of paint formulations are represented by a solvent phase available for diffusion of staining species, and less than 4%, or approximately 10% of the P.V.C. (for simplicity reasons, the pigment phase's density is considered to be approximately 1), are occupied by active stain inhibitor pigments. Obviously, freshly applied paint's high liquid volume ratio indicates a system susceptible to solubilization and diffusion of tannin species, a characteristic which, considering the low volume ratio occupied by the inhibitor pigment phase, is primarily accountable for high staining rates observable during the curing process.

As the result of solvent evaporation, however, coatings collapse to approximately ⅓ of their initial volume and their characteristics change dramatically by the end of the curing process. Comparatively, 33 volume percent of cured coatings, occupied by pigment phases, will be impermeable, while 66 volume percent formed by a continuous resin phase will be available for diffusion of water and dissolved tannins (at comparable low rates, however), and more importantly, about 10.5 volume percent (⅓ of the active pigment phase) will be taken by active stain inhibitor pigments.

The above-described qualitative model provides a plausible explanation, as well, of the relatively higher tannin staining inhibitive capacity displayed by solvent-based coatings on wood, in comparison with corresponding aqueous systems, which includes such considerations as lower solubility of tannins in organic solvents.

Often, according to the actual industrial practice, one solvent based clear coat sealer is applied directly on wood substrates, followed typically by pigmented multiple aqueous paint applications. Such practices, adopted frequently in an effort to enhance the overall tannin staining inhibitive performance of aqueous coatings, constitute severe limitations of such technologies, since the primary objective of eliminating volatile organic compound emissions, objective of which is compromised.

SUMMARY OF THE INVENTION

The above described shortcomings of aqueous paint and coating technologies intended for wood protection, are minimized according to the present invention by providing aqueous "sealer" compositions and treatment procedures applicable on wood surfaces. The aqueous "sealer" composition, according to the present invention, if applied pursuant to an appropriate treatment procedure, alters certain surface characteristics of wood substrates, specifically those related to diffusion of dissolved species across the relevant interface, without causing, however, discoloration, or texture alteration such as grain raising, or solid deposit formation on the substrate. As the result of the "sealing" treatment, undesirable properties of wood substrates such as, tannin staining capacity and staining rate, are spectacularly minimized. Consequently, the aqueous "sealer" compositions and treatment procedure, according to the present invention are applicable in combination with aqueous clearcoat or pigmented white coating technologies intended for wood protection.

As used herein, "wood" is intended to include reconstituted materials such as wood-containing particle board, chip board, or the like, in addition to natural wood substrates, provided that the materials are of a tannin-containing type.

Many other substrates may contain staining components either within their structure or on their surface. Such substrates, in addition to wood, may include plastic materials, stucco, concrete, paper, old painted surfaces, etc.

It was learned according to the present invention, that various and specifically water soluble zirconyl compounds, when applied as clear aqueous solutions onto wood surfaces and subsequently dried, promote "sealing" of such substrates, without discoloration of, without causing grain raising or formation of any visible solid deposit on them.

The sealing effect becomes superbly evident, particularly on wood species characterized by high tannin staining capacity, such as redwood. Any aqueous white paint formulation applied and cured over such substrates, previously "sealed," will form coatings substantially less discolored by tannin staining in comparison with the same on identical "unsealed" surfaces.

Briefly, the invention provides a process of treating substrates including wood, to reduce staining of coatings subsequently applied which includes the steps of providing a solution of a zirconyl compound in a carrier liquid such as water, applying the solution to a substrate surface, and, drying the application. The pore structure, in the case of wood, is modified or sealed so that staining of coating compositions applied subsequently over the surface is reduced. The process is particularly beneficial in cases where the coating composition is a clear sealer or a light-colored latex paint, especially white. The preferred zirconyl compound is zirconyl acetate. The zirconyl salt solution may also contain diverse cationic species, such as lanthanides to provide resistance to UV radiations or (cationic) additives which imparts mildewicidal activity to the composition.

DETAILED DESCRIPTION

The "sealing" effect on surfaces, especially wood, observed according to this invention is explicable, considering the well known polymeric character (prevalent specifically in aqueous mediums) and the ability of zirconyl compounds to form ionic or covalent bonds with —OH or —COOH functional groups (with more than one such bond per zirconyl moiety) and consequently to crosslink molecular species. The chemical structure of wood, considering the typical molecular structure of polysacharides such as cellulose, offers numerous sites for crosslinking by —OH functional groups existent on all related monosaccharide moieties. In the same sense, it is speculated that "sealing" of wood substrates, according to the present invention, occurs by crosslinking of polysaccharide moieties by zirconyl species, thus transforming the microscopic pore structure of wood, presumably at the cellular wall level. Considering the chemical structure of tannins, it is plausible to suppose, that the same chemical mechanism, by crosslinking, could "in situ" immobilize tannin species as well.

The practical realization of the present invention includes several procedures, the most important among them being the application of dissolved zirconyl compounds onto wood substrates which are intended for subsequent application of aqueous white paints. For that purpose, aqueous solutions of zirconyl compounds are applied by common techniques, such as spraying, brushing, rolling, dipping, etc. on selected wood substrates, followed by drying. Since the "sealing" effect is not necessarily the consequence of strictly surface phenomena, the application can be performed under diverse temperature and pressure conditions, as well.

Although aqueous solutions of varying zirconyl contents are applicable in the practice of the present invention, concentrations of 2 to 25% by weight, expressed as % of $ZrO_2$, are preferred.

The "sealing" efficiency of aqueous applications, varies considerably as a function of the zirconyl specie's specific consumption or spreading rate. In this respect, it was observed that spreading rates of 0.5 to 50, and preferably of 3 to 10 mg $ZrO_2$/square inch result in optimal "sealing" performance on any wood species, redwood and oak included.

It was also found, that the "sealing" effect is not necessarily the consequence of a strictly surface process. It was observed, that the procedure's effectiveness, is proportionally enhanced by the time allowed for absorption of zirconyl species by porous substrates, such as wood, up to about 30–40 minutes (considered from the time of the application until it is eventually force dried). Thus, while the process of the present invention appears to involve the surface of a porous substrate and some depth thereunder, it will be referred to generally herein as "sealing".

It is obvious, that any procedure able to increase the rate of relevant diffusion processes, such as pre-wetting of the substrates, performing multiple successive applications on the same substrate or performing the operation under vacuum or elevated temperature and humidity conditions, could potentially shorten the diffusion time and/or enhance the procedure's effectiveness. Alternatively, the employment of surface-active agents (cationic, non-ionic or amphoteric, which are all pH-compatible with acidic media) which reduce the surface tension of aqueous media, could potentially shorten the diffusion time or enhance the procedure's effectiveness.

As to the kinetics of the crosslinking process, the chemical mechanism of the "sealing" process, a modest rate is plausible. Consequently, force drying the application (after allowing for appropriate diffusion time) is preferred in order to complete the crosslinking process. During the development of the present invention, drying of applications was typically performed at 140° F. for about 5 minutes. It will be apparent, however, that diverse drying conditions may be used, such as ambient temperatures for longer periods of time.

After drying, wood substrates treated according to the present invention, as above disclosed, display negligible discoloration, a limited degree of surface hydrophobicity, and more importantly, low tendency for swelling, grain raising and deformation of the substrates.

Considering that such treated wood substrates' natural color and texture are preserved, the "sealing" process, according to the present invention, could itself be considered as enhancing wood surface finishing procedures useful in specific applications.

In a typical sequence of steps common to wood finishing processes, substrates treated according to the foregoing procedure, are ready for the subsequent application of aqueous clear coats or aqueous pigmented white primers, performed pursuant to various coating procedures known in the art. The overall tannin stain inhibitive performance of such aqueous clear coats or white primers will be superior compared to similar aqueous systems and equivalent or superior to common solvent-based systems, all applied on identical wood substrates. It will be noted, that wood substrates treated in accordance with the present invention, are generally compatible with solvent based clear coats or pigmented white primers.

With respect to specific zirconyl compounds applicable to the practice of the invention, it will be observed that essentially any water soluble compounds, "cationic", "anionic" or "neutral" are suitable. This categorization refers to the polymeric and consequently undefined stoichiometry of diverse zirconyl compounds in aqueous solutions, resulting in a variable ionic character of the same dissolved species.

A partial inventory of available water soluble zirconyl compounds includes:

cationic compounds, such as: nitrates, $ZrO(NO_3)_2$; and hydroxychloride, $Zr(OH)OCl$;

anionic compounds, such as: orthosulfate, $H_2ZrO_2(SO_4)_2$; zirconyl ammonium carbonate, $(NH_4)_2[Zr(CO_3)_2(OH)_2]$; zirconyl potassium carbonate, $K_2[Zr(CO_3)_2(OH)_2]$; zirconyl potassium hexafluoride, $K_2ZrF_6$;

neutral compounds, such as: acetate, $ZR(OOC{-}CH_3)_n$; propionate, $ZR(OH_{2.6})$ $(OOC{-}_2C\ _5H_{1.4})$; formate, $Zr(OOC{-}H)_n$, where $n \geqq 4.0$.

These applicable zirconyl compounds are given by way of example, and the invention is not intended to be limited thereby since zirconyl species are the active moiety of such compounds as used in practice of the present invention. It will be within the scope thereof to use related compounds of any chemical composition, provided that the solubility requirement is satisfied.

Considering the intent of the present invention to provide practically zero VOC "sealer" technology for wood protection, water solubility of applicable zirconyl compounds is an important preferred property. It will be noted however, that the present invention's object can be realized by employing zirconyl compounds dissolved in organic solvents, as well.

Based on the hypothesized chemical mechanism for the related crosslinking process, substitution of the pertinent ligand moieties, mostly during drying of the applications, is plausibly as follows:

Wood substrate+Zr(acetate)——→Substrate/Zr+acetic acid.

Presumably, substituted organic ligand, acetic acid according to the above case, could react further with appropriate functional groups of the substrate.

In comparison with simple anionic moieties, it seems that organic ligand characterized by complex structures, although applicable, offer limited additional benefit with respect to the "sealing" procedure's effectiveness.

Extreme pH values, which often characterize the aqueous solutions of some inorganic zirconyl salts, (such as $ZrO(NO_3)_2$, $Zr(OH)OCl$, orthosulfate, all strongly acidic or the quite basic zirconyl ammonium carbonate) when applied, could cause significant discoloration of highly staining wood substrates and consequently, limit the usefulness of such compounds in combination with clear coats. It will be noted, however, that the same does not necessarily constitute a limitation when the application is used in combination with pigmented white coatings.

It was established pursuant to the present invention, that zirconyl acetate, a water soluble product characterized by mildly acidic values of pH, approximately 3 to 4, satisfies all the above specified quality requirements and represents one of the preferred zirconyl compounds for use in the practice of the invention. The chemical composition of the aqueous zirconyl acetate solution, applicable according to the present invention, is variable between relatively large limits, as follows: assay=2 to 25% $ZrO_2$, molar ratio of acetic acid / $ZrO_2$=1.4 to 2.2. Preferred compositions are disclosed in the accompanying examples.

It was also discovered pursuant to the present invention, that it is beneficial to modify the composition of aqueous zirconyl acetate solution by introduction of various cationic species, in variable amounts, compatible with the mildly acidic nature of the former. Although solubility is a limiting factor in this respect, the list of suitable cationic species includes those formed by Group IIA metals (i.e., Mg(II), Ca(II), Sr(II)), as well as Cr(III), Mn(II), Co(II), Ni(II), Cu(II), Ag(I), Cd(II), Hg(II), Pb(II), Ti(IV), Hf(IV), among others.

It was found highly beneficial, however, with respect to usefulness as a surface "sealer", to modify the chemical composition of aqueous zirconyl acetate solution by introduction of Zn(II), Al(III), lanthanides and more especially of Ce(III) or Ce(IV) species, or mixtures thereof.

By considering the well documented UV absorbing capacity of Ce compounds, the benefit of introducing such species into zirconyl acetate solution becomes evident.

Additionally to improve stain inhibitive performance as aqueous sealer, Ce modified zirconyl acetate solution provides enhanced protection against UV radiation, as well. Such protective characteristics are significant, for example, with respect to applications on wood substrates, which are known to be vulnerable to UV radiations, and particularly in conjunction with clear coats. As for the benefit realized by introducing Cu(II), Zn(II) and Al(III) species into the zirconyl acetate solution according to the present invention, it will be noted that these compounds and especially Cu(II), are known for their effective fungicidal and mildewicidal activity. It is important to observe in this sense, that the service conditions of high humidity and warm climate, which promote tannin staining of wood coatings, support also the growth of various fungi on the same. In such conditions, in addition to the aesthetic degradation caused by dark fungal colonies, fungal attack promotes the accelerated breakdown of coatings and ultimately of wood substrates, as well. Consequently, fungal growth control capacity is an important attribute of wood coatings, which able extension of the service life and improvement of the overall protective performance of such systems.

It was learned pursuant to the present invention, that aqueous zirconyl acetate solutions modified by addition of Zn(II), Cu(II), Al(III), lantanides and more specifically Ce(III) species or mixtures thereof, when applied as "sealer" on wood substrates, display complex protective functionalities, including tannin stain inhibition, fungus growth control and protection against UV radiation.

As for the practical preparation of aqueous zirconyl acetate solutions modified by various cationic species, it will be noted that U.S. Pat. No. 3,183,118 among others, discloses such procedures in the preparation of diluted (assay<2%) zirconyl acetate solutions containing Cu(II), Hg(II) and Ni(II). Although apparently no specific literature references are available, methods for the preparation of aqueous zirconyl acetate solution modified by Zn(II), Ce(III), Al(III), etc. species, will be apparent to those informed in the art. According to the present invention, however, oxides, freshly precipitated hydroxides, acetates, carbonates and borates of the cationic species, and more specifically ZnO, $Al(OH)_3$ or aluminum acetate, Ce(III)-carbonate, Cu-borate, are the preferred precursors of the added cationic species.

The practical realization of the aqueous solutions according to the present invention includes the preparation of mixed suspensions containing basic zirconyl carbonate and one or more of the above specified precursors, and solubilization of the solid phases by acetic acid addition, agitation and heating.

The chemical compositions of the modified solutions, according to the present invention, are variable in large ranges, as follows: assay=4 to 24%, (expressed in weight % of total oxides); molar ratio of acetic acid/cationic species=1.4 to 2.2; molar ratio of Zr/added cationic species=20 to 1. Preferred values of these quality parameters are disclosed in the several examples of realization of the present invention.

Aqueous solutions of zirconyl salts, and more specifically diluted ones, are known to be unstable due to "gelling" at temperatures exceeding ambient temperatures. An undesirable behavior which limits the applicability of such solutions as a "sealer", "gelling" can be prevented by employment of various additives, inclusive of hydroxy carboxylic acids, as suggested by Stewart et al in U.S. Pat. No. 3,741,782.

Without any intent of limitation, however, tartaric acid, the stabilizing additive preferred according to the present invention, was found to be compatible with "sealer" applications of zirconyl acetate solutions. See Example 1).

It was also learned pursuant to the present invention, that aqueous solutions of zirconyl salts and specifically modified solutions of zirconyl acetate, are compatible with cationic and non-ionic surface-active agents. Considering the surface-activity, as well as the bactericide and fungicide activity of some quaternary ammonium salt compounds, the employment of such materials as additives to aqueous "sealer" compositions according to the present invention, is understandably preferred.

With no intent of limitation, a commercial product (Dowicil 75 Preservative, available from Dow Chemical Co.), a highly effective bactericide recommended for preparation of aqueous paint formulations, was chosen in order to demonstrate the compatibility of quaternary ammonium salts with aqueous solutions of zirconyl acetate. (See Example 8).

As above mentioned, the practical realization of the present invention is based on application of aqueous solutions of zirconyl compounds, directly on wood substrates, in order to promote "sealing" of the related surfaces and consequently, to inhibit tannin staining of subsequently applied clearcoats or white coatings. Notably, as is known in the art, zirconium compounds interact strongly and in a complex fashion, with diverse polymeric systems as well as with finely divided, dispersed inorganic substrates, both of which are typically present in aqueous paint formulations.

It is assumed that attempts to achieve "sealing" of the interface by introduction of zirconyl compounds directly into paint systems prior to their application on wood substrates, would have comparatively limited success. In such cases, the crosslinking capacity of zirconyl compounds would be consumed by chemical interactions with resin and dispersed solid components of the formulations, consequently reducing their availability to promote "sealing" of the substrate coating interface.

Based on the above specified and earlier disclosed kinetic considerations, it can be concluded, that in order to achieve effective "sealing", direct application of aqueous solutions of zirconyl compounds on wood substrates constitutes the most effective mode of practice of the invention.

EXAMPLES

The following examples illustrate preferred embodiments of the invention, without intention, however, to limit its applicability in any sense, and are intended to provide technical details regarding selected examples of the invention as well as to demonstrate the resulting substantial contribution to the art of surface treatment of wood substrates.

GENERAL

Exemplification of the present invention's reduction to practice includes a brief description of zirconyl acetate solution preparation, and of its modified versions preferred in the practice of the present invention, and more specifically, includes practical details with respect to application of such aqueous solutions on wood substrates. Surface finished redwood and oak veneer panels were selected for that purpose. Zirconyl acetate solution of known concentration was uniformly applied by brushing on such panels of known surface area. The specific spreading rate of zirconyl solution, expressed in mg $ZrO_2$/square inch, was determined gravimetrically or volumetrically, considering the zirconyl acetate solution's assay, applied amounts and the treated wood surfaces' dimensions. The "sealing" process of the treated exhibits' surfaces was completed by allowing 15–20 minutes for absorption at ambient conditions (considered from the moment of completion of the applications) and by subsequent force-drying, typically performed at 140° F. for 5 minutes.

In order to demonstrate the practical effectiveness of the invention, further relevant operations were performed, such as: application of aqueous acrylic clearcoat on "sealed" and unsealed oak veneer substrates, respectively (see Example 9) the application of white pigmented aqueous paints onto previously "sealed" and on identical, but "unsealed" redwood substrates, the latter being considered control exhibits (see Example 3).

Notably, the applied aqueous paint formulations, containing active stain inhibitive pigments, were based on two different commercially available resin components, characterized by quite different tannin staining inhibitive capacities. Curing of the paint applications was performed by keeping them overnight at ambient temperature.

In order to evaluate quantitatively the tannin staining inhibitive efficiency of the "sealing" treatment, the tannin staining performance of "sealed" redwood surfaces was measured (on white paint applications), comparatively to identical untreated panels. For that purpose, redwood panels, prepared as above disclosed, were subjected to condensing humidity conditions for several days and the magnitudes of resulting discolorations of pertinent paint applications were measured by means of computer assisted reflectance spectrophotometer.

Relevant color values (expressed in CIELab color system) measured as dE values versus identical paint applications on non-staining aluminum panels, considered as color standard substrates, allow quantitative evaluation of the "sealing" treatment's effectiveness in inhibition of the redwood substrate's tannin staining activity.

Observing that dE values (measuring the extent of discoloration, as above described) are inversely proportional to tannin staining inhibitive performance of related coatings, it will be evident that such values pertinent to control panels (symbolized hereafter as dEc),compared to those of treated panels (symbolized as dE), allow quantitative characterization of the "sealing" treatment.

The "sealing" treatment's efficiency index (Is) can be calculated according to $$\% \text{Is}=100(\text{dEc}-\text{dE})/\text{dE}.$$

It is important to note, that by measuring the extent of discoloration, as above described, but performed at completion of the drying process, similar characterization of the "sealing" treatment relative to the paint application's drying period, is possible. The evaluation of the "sealing" treatment's stain inhibitive efficiency on oak on which acrylic clearcoat applications were applied in similar fashion as above described. Such data is presented in Example 9.

The following examples disclose various means of exploitation of the present inventions objective, related specifically to tannin staining inhibition.

Example 1

An aqueous solution of zirconyl acetate was prepared following traditional procedures, known in the art.

For that purpose, 100.0 g. of aqueous zirconyl carbonate paste, available with an assay of approximately 39–40% $ZrO_2$, was re-slurried in 200 ml water and subsequently reacted, at normal temperature and agitation, with 39.0 g of glacial acetic acid, in approximately 1:2 stoichiometrical ratio.

The reaction was finalized by keeping the obtained solution at about 60° C. for approximately one hour and by subsequent introduction of 600 ml. water. Approximately 930 g. of clear solution was recovered.

The prepared clear solution, characterized by pH=4.0 , and assay (determined gravimetrically) of 4.7% $ZrO_2$ by weight, was used in all examples of "sealer applications" of the present invention, unless otherwise noted.

Notably, the aqueous solution of zirconyl acetate as above described, displayed a definite tendency for gelling when exposed to higher than ambient temperatures for a longer period of time, for example, 140° F. for 48 hours. As expected, however, the gelling process was found to be reversible at normal temperatures. In such conditions, the complete liquification of gelled solution was observable in a short period of time.

A stabilized version of an aqueous zirconyl acetate solution, as above described, was prepared by addition of 6.0 g. tartaric acid (as aqueous solution of 30%) to 930 g. of the former. Approximately 950 g. of stabilized, but generally unmodified clear solution resulted. The solution, stored at 140° F. for several days, displayed no tendency for gelling during that period of time.

Example 2

White pigmented paint formulations identified as 2.1 and 2.2, recommended for wood protection and applied in context of the present invention are presented below. It will be observed, that both formulations contained a commercially available tannin staining inhibitive pigment.

| Components of formulations 2.1., 2.2. | Trade names & suppliers of components | Parts by Weight 2.1. | Parts by Weight 2.2. |
|---|---|---|---|
| Water | — | 222.0 | 203.0 |
| TiO2 | RCL-535 (1) | 153.0 | 150.0 |
| Filler Pigment | Gammaspers 80 (2) | 119.0 | 116.0 |
| Stain inhibitor pigment | * | 34.0 | 33.0 |
| Coalescent solvent | Butyl carbitol (3) | 9.5 | — |
| | Ethylene glycol | — | 19.5 |
| | Texanol (4) | — | 5.5 |
| Freeze stabilizer/ coalescent | Propylene glycol | 49.0 | — |
| Stabilizer | Surfynol 104 A (5) | 3.5 | 2.0 |
| Thickener | Acrysol SCT 270 (6) | 23.5 | — |
| | Acrysol QR-708 (6) | — | 5.5 |
| | Natrosol 250 MR (7) | 1.5 | 0.5 |
| Dispersant | Colloid 226 (8) | 8.0 | — |
| | Tamol 681 (6) | — | 12.0 |
| Defoamer | Colloid 643 (8) | 4.0 | — |
| Biocide | Nopcocide N-40D (9) | 11.5 | — |

-continued

| Components of formulations 2.1., 2.2. | Trade names & suppliers of components | Parts by Weight | |
|---|---|---|---|
| | | 2.1. | 2.2. |
| | Skane M-8 (6) | — | 2.0 |
| Neutralizer | AMP 95 (10) | 1.5 | — |
| | Ammonia, 28% | — | 1.0 |
| Latex Resin | Synthemul 40-412 (11) | 430.0 | — |
| | Maincote MV-23LO (6) | — | 520.0 |
| | | 1070.0 | 1069.5 |

Suppliers of components are:
(1) SCM Chemicals, (2) Georgia Marble Co., (3) Union Carbide Co., (4) Eastman Chemical Co., (5) Air Products and Chemicals, (6) Rohm and Haas Co., (7) Aqualon, (8) Rhone-Poulenc Ag. Co., (9) Henkel Co., (10) Angus Chemical Co., (11) Reichold Chemicals, Inc.
* commercially available stain inhibitor pigment.

Suppliers of components are:

(1) SCM Chemicals, (2) Georgia Marble Co., (3) Union Carbide Co., (4) Eastman Chemical Co., (5) Air Products and Chemicals, (6) Rohm and Haas Co., (7) Aqualon, (8) Rhone-Poulenc Ag. Co., (9) Henkel Co., (10) Angus Chemical Co., (11) Reichold Chemicals, Inc.

Example 3

The testing of resultant solutions was performed on four surface-finished redwood panels, of about 20 square inches, each. For that purpose, two of the experimental panels were surface "sealed" according to the present invention, by brush application of zirconyl acetate solution prepared according to Example 1.; it was performed by applying 2.0 g. of zirconyl acetate solution per exhibit, determined gravimetrically, at an approximate spreading rate value of 4.7–5.0 mg. $ZrO_2$/square inch, followed by about 20 minutes of absorption time and subsequent forced-drying, at 140° F. for 5 minutes.

Visual examination did not reveal "grain raising" on, or any significant discoloration of the "sealed" substrates, comparatively to the "untreated" control panels.

Paint formulations 2.1. and 2.2., according to Example 2, were applied using a 3 mil letdown bar on each of the control and "sealed" panels, after which all exhibits were allowed to dry overnight at ambient temperature. In order to assess the extent of discoloration which occurred during drying, the color value of all obtained paint applications was measured and compared with non-staining coatings on aluminum panels, which were considered as color standards. Consecutively, all exhibits were exposed to condensing humidity conditions, continuously, for 7 (seven) days (at 100° F.), after which the extent of discoloration which occurred was assessed again in identical fashion, by measuring the related color values, compared to the color standards.

The effectiveness in respect to tannin staining inhibition of the "sealing" treatment, according to the present invention, was evaluated by Is, the efficiency index, calculated for both, the paint applications' curing time and the period of seven days exposure to condensing humidity conditions.

Data characterizing the "sealing" treatment's tannin staining inhibitive performance, relevant to the coatings' curing time and to the condensing humidity exposure period (for seven days), are presented in Table 1 and Table 2, respectively.

TABLE 1

| Applied paint formula: according to Example 2 | dE | dEc | Is, % |
|---|---|---|---|
| 2.1. | 8.0 | 4.0 | 100 |
| 2.2. | 4.2 | 0.8 | 425 |

TABLE 2

| | | | |
|---|---|---|---|
| 2.1. | 50.0 | 12.0 | 316 |
| 2.2. | 11.0 | 2.0 | 450 |

Is values presented in Tables 1 and 2, ranging 100–450, or more typically 300–450, indicate that the aqueous "sealing" composition and treatment, performed pursuant to the present invention, was highly effective with respect to reduction of redwood substrates' tannin staining capacity. Based on related practical expertise, it will be observed, that tannin staining inhibition of comparable magnitude is not achievable by active pigmentation of aqueous or solvent-based protective coatings, the alternative technique known by the prior art.

Example 4

Modified aqueous solution of zirconyl acetate, containing Zn(II) and acetic acid in approximate molar ratios of n(Zr):n(Zn)=3:1 and n(acetic acid):[n(Zn)+n(Zr)]=1,5:1, respectively, was prepared according to as follows: 100.0 g. of aqueous paste of zirconyl carbonate (see Example 1) and 8.5 g. of commercially available high grade ZnO, was reslurried in 150.0 ml. water, and subsequently reacted with 40.0 g. of glacial acetic acid in similar fashion as described in Example 1.

The solubilization process was completed in about 2 hours, after which 50.0 ml. of water were added to the reaction medium. The obtained clear solution was characterized by pH=4.1 to 4.3 and assay by weight (determined by ignition at 600° C.) of approximately ($ZrO_2$+ZnO)=15.5%.

Example 5

Aqueous solution of zirconyl Acetate modified by introduction of Ce(III) species, containing Ce(III) and acetic acid in molar ratios of approximately n(Zr):n(Ce)=4:1 and n(acetic acid):[n(Ce)+n(Zr)]=1.7:1, respectively, produced pursuant to the following procedure.

Initially, an aqueous mixed suspension was prepared by dispersing 166.0 g. of wet zirconyl carbonate (see Example 1) and 36.0 g. of $Ce_2(CO_3)_3(H_2O)_3$ (technical grade, commercially available from Molycorp Inc.) in 160.0 ml. water. The mixed suspension was subsequently solubilized by gradual introduction of 72.0 g. glacial acetic acid with extensive agitation at 40–45° C., the process being completed by maintaining these conditions for about 4 hours. Approximately 400 g. of clear but slightly yellow solution resulted, characterized by the following quality parameter values: assay (by ignition at 600° C.), as ($ZrO_2$+$CeO_2$)=21%; pH=3.5 to 4.0; specific gravity=1.24; yield=approximately 400 g.

Obviously, the recommended amounts of cerium-carbonate are replaceable by equivalent amounts of cerium-acetate. It will be noted, as well, that alternatively, cerium-carbonate can be substituted for other lanthanides or mixed-lanthanide (Ln) compounds (available from the same supplier), such as La-carbonate and Ln-Carbonate, respectively.

Example 6

Aqueous solution of zirconyl acetate modified by addition of Cu(II) species, containing Cu and acetic acid in molar ratios of approximately n(Zr):n(Cu)=9:1 and n(acetic acid):[n(Zr)+n(Cu)]=1.6:1, respectively, produced essentially according to the procedure presented in Example 5. In this case, however, 192.0 g. of wet zirconyl carbonate (see Example 1), 10.0 g. of commercially available $Cu(BO_2)_2$, (Cu(II)-borate) or alternatively, 3.5 g. $Cu(OOC—CH_3)_2H_2O$, (Cu(II)— acetate) was dispersed in 150 ml water and dissolved in 68.0 g. glacial acetic acid. The resulted clear, moderately blue solution was characterized by the following quality parameter values: assay (by ignition) of about 20%, as ($ZrO_2$+CuO); pH=3 to 4; specific gravity=1.23/24° C.; yield=approximately 400 g.

Example 7

Aqueous solution of zirconyl acetate modified by addition of Al(III) species, containing Al and acetic acid in molar ratios of approximately n(Zr):n(Al)=4:1 and n(acetic acid):[n(Zr)+n(Al)]=1.7:1, respectively, was produced as follows: 153.0 g. of wet zirconyl carbonate (see Example 1) and freshly precipitated, washed aluminum hydroxide paste containing 9.5 g. of $Al(OH)_3$, was dispersed in 180.0 ml. water and subsequently dissolved by gradual addition of 72.0 g. glacial acetic acid, under extensive agitation at approximately 50° C. The resulted clear solution was characterized by the following quality parameter values: assay (by ignition) approximately 18%, as ($ZrO_2$+$Al_2O_3$); pH=3 to 4; yield=approximately 400.0 g.

Example 8

Aqueous solution of zirconyl acetate was modified by addition of organic cationic species, such as typical for quaternary ammonium salts. For that purpose 1.77 g. of 1-(3-chloroallyl)- 3,5,7-triaza-1-azoniaadamantane chloride, as aqueous solution of 5.0% (available from The Dow Chemical Co. under the trade name of Dowicil 75 Preservative, containing 67.5% of active ingredient) was gradually introduced by agitation into 400.0 of zirconyl acetate solution obtained according to Example 4. The preparation process was finalized by agitation until a clear solution of similar quality as described in Example 4, was obtained. The final product's calculated content of quaternary ammonium salt was approximately 0.3%.

Example 9

An application of the present invention was performed on surface finished oak panels in combination with an aqueous clearcoat. The intent was to demonstrate the tannin stain inhibitive effectiveness of the "sealing" treatment on oak, as well as to prove the compatibility of such surface treated substrates with aqueous clear applications.

For that purpose 1.0 ml. of Ce(III)—modified aqueous solution of zirconyl acetate, (prepared according to Example 5 of the present invention and diluted in 1:1 ratio with water) was applied by brush to one-half of the surface of an oak veneer panel (approximately 28 square inches surface area was covered), allowed for 15 minutes to absorb and subsequently force-dried at 120° F. for 5 minutes. The spreading rate was approximately 4.5 mg. of ($ZrO_2$+$CeO_2$)/square inch.

On visual examination, the "sealed" portion of the oak substrate did not display significant discoloration or any texture modification, inclusive "grain raising".

Subsequent to the treatment as above described, the entire surface (inclusive the "sealed" section) of the oak veneer panel was coated by three successive brush applications of a commercial clear acrylic latex (obtained commercially from Deft Coatings under the trade name of "Safe & Easy" Interior Wood Finish). One hour of drying time was allowed and sanding was performed between coats.

After drying overnight under ambient conditions, the test panel was later exposed to condensing humidity conditions at 100° F. for 24 hours and subsequently the related dEc and dE values were measured, following the previously described experimental technique.

It is important to note, in this case the freshly "sealed", veneer surface which was uncoated and not exposed to condensing humidity was chosen as the color standard against which all of the dE values were measured.

Is, the value of the Efficiency Index of the "sealing" treatment was calculated as above specified. dEc=13.8 and dE=6.1, determined to be the discoloration values after humidity exposure, measured on the "sealed" and on the untreated sections of the test panel, respectively. The determined value of Is=126%, indicates highly effective tannin stain inhibitive performance on oak by the "sealer" treatment, applied in combination with aqueous acrylic clearcoats.

I claim:

1. A composition for treating a substrate to reduce the staining of coatings subsequently applied thereto comprising:

a solution of a zirconyl compound in a carrier liquid in a concentration sufficient to provide an effective stain reducing amount when coated on a substrate, said solution further comprising a lanthanide compound in an amount effective to provide protection to said substrate against UV radiation.

2. A composition according to claim 1 wherein said carrier liquid comprises water.

3. A composition according to claim 1 wherein said lanthanide compound comprises cerium.

4. A composition according to claim 1 wherein said coating composition further comprises at least one metal cation selected from Mg(II), Ca(II), Sr(II)), as well as Cr(III), Mn(II), Co(II), Ni(II), Cu(II), Ag(I), Cd(II), Hg(II), Pb(II), Ti(IV), Hf(IV) or quaternary ammonium compound in an amount effective to impart mildewicial protection to said substrate.

5. A composition according to claim 1 wherein said zirconyl compound comprises zirconyl acetate.

6. A composition for treating a substrate to reduce the staining of coatings subsequently applied thereto comprising:

a solution of a zirconyl compound in a carrier liquid in a concentration sufficient to provide an effective stain reducing amount when coated on a substrate, said solution comprising a metal cation selected from Mg(II), Ca(II), Sr(II)), as well as Cr(III), Mn(II), Co(II), Ni(II), Cu(II), Ag(I), Cd(II), Hg(II), Pb(II), Ti(IV), Hf(IV) in an amount effective to impart mildewicial protection to said substrate, and, a lanthanide compound in an amount effective to provide protection to said substrate against UV radiation.

7. A substrate having a surface thereof prepared for application thereto of a coating composition, the surface being treated with a solution containing a zirconyl compound and a lanthanide compound in an amount effective to provide protection to said substrate against UV radiation and dried, whereby staining of coating compositions applied subsequently over said surface is reduced.

8. A substrate according to claim 7 comprising wood.

9. A substrate having a surface thereof prepared for application thereto of a coating composition, the surface being treated with a solution containing a zirconyl compound and dried, whereby staining of coating compositions applied subsequently over said surface is reduced, a lanthanide compound in an amount effective to provide protection to said substrate against UV radiation, and a metal cation selected from Mg(II), Ca(II), Sr(II)), as well as Cr(III), Mn(II), Co(II), Ni(II), Cu(II), Ag(I), Cd(II), Hg(II), Pb(II), Ti(IV), Hf(IV) or a quaternary ammonium compound in an amount effective to impart mildewicial protection to said substrate.

10. A process for treating a substrate to reduce the staining of coatings subsequently applied thereto comprising:

providing a solution of an organic or inorganic zirconyl compound in a carrier liquid, said solution further comprising a lanthanide compound in an amount effective to provide protection to said substrate against UV radiation applying said solution to a surface of said substrate, and, drying said solution;

whereby staining of coating compositions applied subsequently over said surface and degradation thereof due to UV radiation are reduced.

11. A process according to claim 10 wherein said carrier liquid comprises water.

12. A process according to claim 10 wherein said coating composition comprises a light-colored latex paint.

13. A process according to claim 10 wherein said coating composition comprises a clear sealer composition.

14. A process according to claim 10 wherein said zirconyl compound comprises zirconyl acetate.

15. A process according to claim 10 wherein said substrate is porous.

16. A process according to claim 10 wherein said substrate comprises wood.

17. A process for treating a substrate to reduce the staining of coatings subsequently applied thereto comprising:

providing a solution of an organic or inorganic zirconyl compound in a carrier liquid, and a lanthanide compound in an amount effective to provide protection to said substrate against UV radiation, said solution further comprising at least one metal cation selected from Mg(II), Ca(II), Sr(II)), as well as Cr(III), Mn(II), Co(II), Ni(II), Cu(II), Ag(I), Cd(II), Hg(II), Pb(II), Ti(IV), Hf(IV) in an amount effective to impart mildewicial protection to said substrate;

applying said solution to a surface of said substrate; and, drying said solution;

whereby staining of coating compositions applied subsequently over said surface and discoloration thereof due to mildew are reduced.

18. A substrate according to claim 17 comprising wood.

* * * * *